US006247519B1

(12) United States Patent
Lo et al.

(10) Patent No.: US 6,247,519 B1
(45) Date of Patent: Jun. 19, 2001

(54) PREFORM FOR MAGNESIUM METAL MATRIX COMPOSITES

(75) Inventors: Jason Sin Hin Lo; Areekattuthazhayil K. Kuriakose, both of Nepean; Raul Santos, Ottawa, all of (CA)

(73) Assignee: Her Majesty the Queen in right of Canada, as represented by the Minister of Natural Resources, Ottawa (CA)

( * ) Notice: Subject to any disclaimer, the term of this patent is extended or adjusted under 35 U.S.C. 154(b) by 0 days.

(21) Appl. No.: 09/357,161

(22) Filed: Jul. 19, 1999

(51) Int. Cl.[7] .................................................. B22D 19/02
(52) U.S. Cl. ............................................. 164/98; 264/603
(58) Field of Search ....................... 164/98, 97; 264/603, 264/333

(56) References Cited

U.S. PATENT DOCUMENTS

| | | |
|---|---|---|
| 3,529,655 | 9/1970 | Lawrence . |
| 4,279,289 | 7/1981 | Ban et al. . |
| 4,548,774 | 10/1985 | Akiyama et al. . |
| 4,657,876 | 4/1987 | Hillig . |
| 4,715,422 | 12/1987 | Tommis et al. . |
| 4,800,065 | 1/1989 | Christodoulou et al. . |
| 4,932,099 | 6/1990 | Corwin . |
| 4,995,444 | 2/1991 | Jolly et al. . |
| 5,141,683 | 8/1992 | Hyndman et al. . |
| 5,322,109 | 6/1994 | Cornie . |
| 5,347,426 | 9/1994 | Dermarkar et al. . |
| 5,360,662 | 11/1994 | Wong . |
| 5,409,580 | 4/1995 | Gesing et al. . |
| 5,458,181 | 10/1995 | Corbett et al. . |
| 5,464,583 | 11/1995 | Lessing . |
| 5,571,758 | 11/1996 | Grossman . |
| 5,711,362 | 1/1998 | Rohatgi . |
| 5,765,624 | 6/1998 | Hathaway et al. . |
| 5,791,397 | 8/1998 | Suzuoki et al. . |
| 5,817,432 | 10/1998 | Chwastiak et al. . |
| 5,839,329 | 11/1998 | Smith et al. . |

FOREIGN PATENT DOCUMENTS

| | | |
|---|---|---|
| 852134 | 9/1970 | (CA) . |
| 890809 | 1/1972 | (CA) . |
| 1200674 | 2/1986 | (CA) . |
| 2000770 | 4/1990 | (CA) . |
| 2040499 | 10/1992 | (CA) . |
| 2145161 | 3/1994 | (CA) . |
| 2238520 | 6/1997 | (CA) . |
| 2257081 | 3/1998 | (CA) . |

*Primary Examiner*—Kuang Y. Lin
(74) *Attorney, Agent, or Firm*—Robert A. Wilkes

(57) ABSTRACT

A process for preparing a preform for use in a metal matrix composite, particularly for a magnesium metal composite, and a metal matrix composite, typically made by squeeze casting, using the preform. In the preform the reinforcing material typically is silicon carbide, boron nitride, carbon or graphite. The binder used in the preform is magnesium fluoride, which avoids the known problems which result from the high reactivity of magnesium metal with other binders, such as silica and alumina, which results in the formation of magnesium oxide in the reinforced composite. The presence of magnesium oxide crystals in the metal matrix adversely affects the properties of the composite.

13 Claims, No Drawings

PREFORM FOR MAGNESIUM METAL MATRIX COMPOSITES

This invention is concerned with reinforcing preforms used in the production of metal matrix composites, and with the resulting reinforced metal. More particularly, this invention is concerned with preforms for use in making magnesium metal matrix composites.

It is well known that many metals, especially the so-called light metals, which generally includes aluminum, magnesium, and alloys of each of these metals, whilst having many of the advantages of a metal, such as the ability to be welded, and the particular advantage of low weight, also have the disadvantage that their strength properties are relatively low. In the past, this has limited the usefulness of these metals. One method that has been proposed to overcome this difficulty is to use the metals in the form of a composite, so that the composite more than compensates for the lack of mechanical, physical and other properties. Typical materials used as the reinforcement in such a composite include carbon, graphite, silicon carbide, titanium diboride, boron carbide and boron nitride. Techniques for making metal matrix composites from both aluminum and magnesium are well known, and have been described for example in U.S. Pat. No. 4,279,289; U.S. Pat. No. 4,715,442; U.S. Pat. No. 4,995,444 and U.S. Pat. No. 5,791,397.

These methods broadly involve a two step technique. In the first step, a preform is made from the reinforcing material, which is held together with a binder material. The commonly used binders are ceramic materials, of which silica is perhaps the commonest. The reinforcing material is generally invested with the binder system, and then fired both to burn off organic materials used to aid investment with the binder, and to convert the binder into silica. In the second step, the preform is invested with the molten metal to provide a composite material, typically by using the so-called squeeze casting technique, in which the molten metal is forced into the preform in a mould containing the preform under high pressure.

Although these methods are more or less successful with aluminum, and aluminum alloys, they are less successful when used to fabricate composites in which the metal is magnesium, or a magnesium containing alloy. The difficulties arise from the fact that molten magnesium is a very reactive material, which has two consequences.

The first is that the use of silica as the preform binder becomes questionable, because the following reaction occurs:

$$2Mg+SiO_2 \rightarrow Si+2MgO.$$

The silicon that is formed will dissolve into the magnesium to form a silicon-magnesium phase which generally will not have a deleterious effect on the properties of the magnesium metal, and thus of the resulting composite. The magnesium oxide however is formed as a more or less crystalline solid, which does not dissolve in the magnesium metal. The presence of these crystals of magnesium oxide has been shown to have a deleterious effect on the overall properties of the composite when a sufficient amount is present. It can therefore be seen that this reaction places significant restrictions on the preform binder that can be used if the creation of magnesium oxide is to be avoided.

The second is that similar reactions will also happen with several of the other materials commonly used as either binders or reinforcement; all of the following reactions are known to occur:

$$3Mg+Al_2O_3 \rightarrow 2Al+3MgO$$

$$2Mg+TiO_2 \rightarrow Ti+2MgO$$

$$Mg_3(PO_4)_2+8Mg \rightarrow 8MgO+P$$

The aluminum and titanium alloy with the magnesium, and the phosphorus vaporizes. In the first two cases, although the aluminum and titanium have minimal, if any, effect on the properties of the resulting composite, this cannot be said for the magnesium oxide crystals that are produced in all three cases. The presence of brittle and weak magnesium oxide crystals makes the composite prone to crack formation. It can also be seen that these reactions place significant limitations on the materials which can be used to reinforce magnesium if the creation of magnesium oxide is to be avoided.

There is therefore a need for a binder system that can be used to create preforms for use in the manufacture of composites, in which the metal used is magnesium, or a magnesium alloy. Further, such a binder system should desirably be equally useful with both particulate and fibrous reinforcing materials, and should be potentially useful with other, less reactive, metals.

This invention seeks to provide a process for preparing a preform for a magnesium metal matrix composite which involves the use of a preform binder system which is unreactive with molten magnesium, does not cause the creation of undesirable solid materials in the magnesium composite, and which can be used with the reinforcing materials commonly used with magnesium which do not involve the formation of magnesium oxide during the casting process. In addition, this invention also seeks to provide a process for preparing a preform useful in composites in which the metal is not magnesium, such as aluminum and aluminum alloy composites.

Thus in a first broad embodiment this invention seeks to provide a process for preparing a preform for use in a metal matrix composite comprising:

(a) forming a slurry of the reinforcing material with magnesium fluoride in an aqueous solution of magnesium chloride;

(b) pouring the slurry into a mould;

(c) allowing the slurry in the mould to set, to provide a shaped green preform;

(d) drying the green preform to remove water; and (e) firing the green preform at a temperature of about 1,100° C. to provide a finished preform, in which the binder is sintered magnesium fluoride.

In a second broad embodiment this invention seeks to provide a process for fabricating a metal matrix composite comprising:

(a) forming a slurry of the reinforcing material with magnesium fluoride in an aqueous solution of magnesium chloride;

(b) pouring the slurry into a first mould;

(c) allowing the slurry in the first mould to set, to provide a green preform;

(d) drying the green preform to remove water;

(e) firing the green preform at a temperature of about 1,100° C. to provide a finished preform, in which the binder is sintered magnesium fluoride;

(f) placing the preform in a second mould; and (g) infiltrating the preform in the second mould with molten metal to provide a metal composite.

In a third broad embodiment, this invention seeks to provide a metal matrix composite, including a reinforcement preform bonded with sintered magnesium fluoride.

Preferably, the metal is a light metal. More preferably, the metal is aluminum, magnesium, or an alloy thereof. Most preferably, the metal is magnesium, or an alloy thereof.

Preferably, a porous mould is used in step (b).

Preferably, the reinforcement used in the preform is chosen from at least one member of the group consisting of carbon, graphite, boron carbide, silicon carbide, titanium diboride, boron nitride, and mixtures thereof.

Preferably, a particulate reinforcement is used in step (a). Alternatively, a fiber, tow or whisker reinforcement is used in step (a). In a further alternative, a mixture of particulate and/or fibre and/or tow and/or whisker reinforcement is used in step (a), so that a hybrid composite is obtained including more than one reinforcement in more than one physical form.

Preferably, the green preform is air dried in an oven in step (d). More preferably, the green preform is air dried in an oven at about 45° C. in step (d).

Preferably, in step (g) a squeeze casting procedure is used.

During these processes a slurry is first prepared of the reinforcing material, for example of particulate silicon carbide, mixed with magnesium fluoride in a solution of magnesium chloride. The slurry is poured into a porous mould, for example to provide a disc shaped preform, and allowed to set. During the setting process, hydrated magnesium chloride, $MgCl_2.6H_2O$, is formed, which serves as a low temperature binder, to hold the green preform together. The cast disc is then air dried, typically by gentle heating in an oven at about 45° C. The use of a porous mould ensures that the preform dries evenly, and without cracking or other deformation, during the drying step. The hydrated magnesium chloride imparts sufficient green strength to the preform to enable it to be handled with reasonable care.

The dried green preform is then fired at about 1,100° C. In the firing step, the magnesium chloride decomposes, and is essentially driven off; at the same time the magnesium fluoride sinters, bonding the silicon carbide powder together to form a porous body. The resulting fired disc is also quite strong enough to be handled.

In order to make a magnesium metal composite, the shaped preform is placed in a second mould, and then infiltrated with molten magnesium, or a molten magnesium alloy. Typical alloying elements include aluminum, beryllium, calcium, copper, lithium, manganese, metals from the rare earths group, silicon, silver, thorium, tin, zinc, zirconium, and yttrium, and combinations of metals. It is preferred that the infiltration of the preform to provide the desired metal composite is carried out by the squeeze casting method.

It can thus be seen that the binder of this invention avoids the difficulties attendant on the use of a binder with which the molten magnesium can react. Examination of magnesium composites made by this process, in which the reinforcement is silicon carbide, shows that the majority of the magnesium fluoride remains bonded to the silicon carbide. A proportion of it appears to crack away, and does not apparently have any deleterious effect on the properties of the composite.

Although the magnesium fluoride binder used in the process of this invention is uniquely suitable for use in preforms which are later infiltrated with molten magnesium or a molten magnesium alloy since it will not react with them, it is not so limited. It is suitable for use with other metals where the reaction problem does not arise, in particular aluminum and aluminum alloys.

What is claimed is:

1. A process for preparing a preform for use in a metal matrix composite comprising:
    (a) forming a slurry of a reinforcing material with magnesium fluoride in an aqueous solution of magnesium chloride;
    (b) pouring the slurry into a mould;
    (c) allowing the slurry in the mould to set, to provide a shaped green preform;
    (d) drying the green preform to remove water; and
    (e) firing the green preform at a temperature of about 1,100° C. to provide a finished preform, in which the binder is sintered magnesium fluoride.

2. A process according to claim 1 wherein the reinforcement material used in the preform is chosen from at least one member of the group consisting of carbon, graphite, silicon carbide, titanium diboride, boron carbide, boron nitride and mixtures thereof.

3. A process according to claim 1 wherein the reinforcement material used in step (a) is in a physical form chosen from at least one of the group consisting of particulate, fibre, tow, whisker and mixtures thereof.

4. A process according to claim 1 wherein a porous mould is used in step (b).

5. A process according to claim 1 wherein the green preform is air dried in an oven in step (d).

6. A process according to claim 1 wherein the green preform is air dried in an oven at about 45° C. in step (d).

7. A process for fabricating a metal composite comprising:
    (a) forming a slurry of a reinforcing material with magnesium fluoride in an aqueous solution of magnesium chloride;
    (b) pouring the slurry into a first mould;
    (c) allowing the slurry in the mould to set, to provide a green preform;
    (d) drying the green preform to remove water;
    (e) firing the green preform at a temperature of about 1,100° C. to provide a preform, in which the binder is sintered magnesium fluoride;
    (f) placing the preform in a second mould; and
    (g) infiltrating the preform in the mould with molten metal to provide a metal composite.

8. A process according to claim 2 wherein the reinforcement material used in the preform is chosen from at least one member of the group consisting of carbon, graphite, silicon carbide, titanium diboride, boron carbide, boron nitride and mixtures thereof.

9. A process according to claim 2 wherein the reinforcement material used in step (a) is in a physical form chosen from at least one of the group consisting of particulate, fibre, tow, whisker and mixtures thereof.

10. A process according to claim 2 wherein a porous mould is used in step (b).

11. A process according to claim 2 wherein the green preform is air dried in an oven in step (d).

12. A process according to claim 2 wherein the green preform is air dried in an oven at about 45° C. in step (d).

13. A process according to claim 2 wherein a squeeze casting procedure is used in step (g).

* * * * *